(12) United States Patent
McGilton et al.

(10) Patent No.: US 12,258,748 B1
(45) Date of Patent: Mar. 25, 2025

(54) AFFORDABLE BUILDINGS AND METHODS OF CONSTRUCTING THEM

(71) Applicant: Global 1 Habitats, LLC, Clayton, NC (US)

(72) Inventors: Gordon R. McGilton, Clayton, NC (US); Larry E. Elliott, Clayton, NC (US)

(73) Assignee: Global 1 Habitats, LLC, Clayton, NC (US)

( * ) Notice: Subject to any disclaimer, the term of this patent is extended or adjusted under 35 U.S.C. 154(b) by 99 days.

(21) Appl. No.: 17/899,015

(22) Filed: Aug. 30, 2022

Related U.S. Application Data

(60) Provisional application No. 63/238,359, filed on Aug. 30, 2021.

(51) Int. Cl.
| | |
|---|---|
| *E04B 1/12* | (2006.01) |
| *E04B 1/61* | (2006.01) |
| *F16B 47/00* | (2006.01) |

(52) U.S. Cl.
CPC .............. *E04B 1/12* (2013.01); *E04B 1/6145* (2013.01); *F16B 47/003* (2013.01)

(58) Field of Classification Search
CPC ........................................................ E04B 1/12
See application file for complete search history.

(56) References Cited

U.S. PATENT DOCUMENTS

| | | | | |
|---|---|---|---|---|
| 4,774,794 A | * | 10/1988 | Grieb | E04B 7/225 52/309.7 |
| 5,181,353 A | | 1/1993 | Harrington, Jr. | |
| 5,803,964 A | * | 9/1998 | Scarborough | E04B 1/161 106/737 |
| 5,927,032 A | * | 7/1999 | Record | E04C 2/288 52/412 |
| 5,943,775 A | | 8/1999 | Lanahan et al. | |
| 6,460,302 B1 | * | 10/2002 | Neuhaus, III | E04B 1/161 52/261 |
| 7,373,731 B2 | | 5/2008 | Nyberg | |
| 8,065,840 B2 | * | 11/2011 | Zaidi | E04H 1/005 52/745.1 |
| 9,328,506 B2 | | 5/2016 | Gibson | |
| D861,194 S | | 9/2019 | Morrow | |
| 10,422,156 B1 | | 9/2019 | Morrow | |
| 10,450,736 B2 | * | 10/2019 | Morrow | E04B 1/80 |
| 10,865,560 B1 | * | 12/2020 | Morrow | E04B 2/16 |
| 11,015,340 B2 | * | 5/2021 | Morrow | E04B 7/026 |
| 11,286,658 B2 | * | 3/2022 | Morrow | E04B 5/023 |
| 11,352,775 B2 | | 6/2022 | Morrow | |
| 11,401,724 B2 | | 8/2022 | Morrow | |

(Continued)

FOREIGN PATENT DOCUMENTS

KR          101021514 B1 *   3/2011

*Primary Examiner* — Joshua K Ihezie
(74) *Attorney, Agent, or Firm* — MacCord Mason PLLC

(57) ABSTRACT

Building techniques and structures to fabricate components of expanded polystyrene (EPS) for assembly into a building include structures and ways to make keys to provide shear strength between components, structures and ways to minimize infiltration paths between walls and floors and walls and roof while reducing labor, material wastage and logistics complications. By way of example, components are strategically cut from a block of EPS using a hot wire moving through the block to cut components to a desired and novel configuration.

15 Claims, 18 Drawing Sheets

(56) References Cited

U.S. PATENT DOCUMENTS

| | | | |
|---|---|---|---|
| 11,697,946 B2 | 7/2023 | Morrow | |
| D994,148 S * | 8/2023 | Morrow | D25/138 |
| 2004/0107652 A1 | 6/2004 | Elliott | |
| 2005/0166533 A1 | 8/2005 | Strickland | |
| 2009/0277031 A1 | 11/2009 | Stocking | |
| 2010/0011699 A1* | 1/2010 | Weimer | E04C 2/52 |
| | | | 52/745.1 |
| 2010/0095621 A1* | 4/2010 | Pumper | E04B 1/80 |
| | | | 52/762 |
| 2010/0269420 A1 | 10/2010 | Zaidi | |
| 2011/0047912 A1 | 3/2011 | Armijo | |
| 2011/0054652 A1 | 3/2011 | Heil | |
| 2011/0113707 A1 | 5/2011 | Stephens, Jr. | |
| 2013/0036688 A1* | 2/2013 | Gosain | E04B 2/8652 |
| | | | 52/220.1 |
| 2013/0042556 A1 | 2/2013 | Armijo | |
| 2013/0086850 A1* | 4/2013 | Morrow | E04B 1/04 |
| | | | 52/309.4 |
| 2013/0227900 A1 | 9/2013 | Peterson | |
| 2014/0069040 A1* | 3/2014 | Gibson | E04B 1/14 |
| | | | 52/506.01 |
| 2015/0135634 A1* | 5/2015 | Hoie | E04C 2/243 |
| | | | 52/745.05 |
| 2016/0208489 A1 | 7/2016 | Gibson | |
| 2016/0326769 A1 | 11/2016 | Morrow | |
| 2017/0368785 A1 | 12/2017 | Fox et al. | |
| 2018/0132428 A1* | 5/2018 | Feng | E04B 1/541 |
| 2019/0242109 A1* | 8/2019 | Morrow | E04B 2/562 |
| 2020/0354945 A1* | 11/2020 | Morrow | E04B 1/24 |
| 2021/0040722 A1 | 2/2021 | Morrow | |
| 2021/0054589 A1* | 2/2021 | Myer | E02D 27/01 |
| 2022/0220728 A1* | 7/2022 | Morrow | E04B 5/08 |

\* cited by examiner

AFFORDABLE BUILDINGS AND METHODS OF CONSTRUCTING THEM

BACKGROUND

This application claims the benefit of U.S. provisional application No. 63/238,359, filed Aug. 30, 2021, which is incorporated herein by reference in its entirety.

The inventions of the present application relate to improvements in building construction. The need for affordable housing that is durable, reliably and quickly constructed, and energy efficient is ever present. Attempts to address this need have been ongoing and challenges have been addressed with limited success. One methodology is to use blocks of expanded polystyrene (EPS) assembled into bearing walls, providing a quick and inexpensive building method. Sufficiently thick EPS is structurally strong enough to support the loads required in a small structure such as a small, one-story dwelling. The primary load will be the weight of a roof and the attendant weather forces on the roof. A rudimentary installation using EPS in the Sarasota, Florida area has already survived two hurricanes with virtually no damage showing promising durability. Accordingly, Applicant has continuing interest in using expanded polystyrene as a structural building material.

It is known to make EPS building components from a large block of EPS by using a hot wire cutter to melt and cut the EPS. The hot wire is pressed through the EPS block in a controlled fashion, melting the EPS as it goes, resulting in controlled cuts to separate EPS components from the block.

Nonetheless, there is a continuing need for further efficiencies in the use of EPS as a building material and need for development of structures and methodologies using EPS that may result in sustainable housing meeting the challenges discussed without the drawbacks recognized by Applicant.

SUMMARY OF THE INVENTION

The inventions of the present disclosure fulfill one or more of these or other needs in the art. In some instances, the inventions of the present disclosure may provide a building have one or more of the following attributes:

1. One example of a novel technique and structure is in the making of a spline for each of two adjacent EPS wall components using a hot wire cutter. When cutting the wall components from a larger EPS block from one another, the wire also creates opposed grooves in those components. The two lengths of EPS taken from the grooves together may become a spline to span the grooves. The two lengths may be rotated 90 degrees from their cut orientation so they span the gap between the two components, the separation between the lengths thus being transverse to the separation between the adjacent EPS wall components.
2. Components cut as a One Piece Corner (OPC) may be integrally made up of two vertical walls meeting to form a corner, such component also being useable as a corner where a vertical wall meets a floor. The one piece corner is a monolithic component that eliminates a potential infiltration path that normally would exist if the two walls and/or the wall and the floor were individual components. Thus, additional materials or labor to close the potential infiltration path are not needed.
3. Components cut as a Combination One Piece Corner (COPC) integrally made up of two vertical walls and a partial floor component, again as a monolithic component. The COPC may interlock with the adjoining components to positively align them, eliminating potential alignment error and further easing the accurate assembly of the final product structure. The COPC may be made in a discontinuous sequence. In this example, the block of EPS is cut as with other components, but the COPC is partially formed, then the ancillary finished components are removed before final formation of the COPC is completed.
4. A one piece soffit or eave (OPE) that forms the top of the wall and the bottom of the roof, cut out of EPC. This, too, is a monolith that may be used as the uppermost portion of the sidewall, the eave facia and soffit, and in some examples as well as the lower portion of the roof field. This construction structure eliminates multiple potential infiltration paths. Incorporating multiple functions in the component (for each of the OPC, COPC and OPE) reduces opportunities for error during assembly, reduces the labor needed, reduces part numbers, and reduces the potential logistics footprint involved in managing more components.
5. Roof and/or wall and/or floor components made of EPS components are held together with the spline and groove arrangement.
6. Having a door and window installation using a cut-out frame that gets reinstalled on a window flange or nailing fin to secure the window or door in place.
7. Installing a magnesium oxide (MgO) facing board on EPS components that in one example provide the option to have been assembled at a jobsite. Onsite installation permits the MgO board to be mounted to cover the seams that result from the joining of the EPS components, making a more airtight and watertight construction and overall structure.
8. A full size floor plan is printed on film, with areas of the floor plan where partitions are to be installed weakened by die cutting to enable later removal to allow adhesive to be placed on the floor to hold the partition in place.

In one embodiment, a building assembly includes a set of components of expanded polystyrene (EPS) assembled to form a building. The components may be formed using a hot wire cutter that cuts the components from a set of EPS blocks. In this example, at least a portion of the components are adapted to be mated one with another to form the walls and the floor of the building. A set of magnesium oxide (MgO) sheets may be included by overlaying atop the components to provide strength and durability to the floor of the assembly.

In other embodiments an EPS component may be cut from an EPS block. The EPS component may include a channel and a spline cut from the channel. The channel may accept the spline turned perpendicular to the cut. The spline may be joined with a second spline from a second EPS component and the adjoined spline turned perpendicular to the cut, the adjoined spline fitting between the aligned channels of the two EPS components.

Some embodiments include EPS components forming floor components, roof components, and wall components, the collective components fitting together for form a building of EPS components structure. A MgO sheet may be added to the components on one and/or a second side of the component.

The above summary was intended to summarize certain embodiments of the present disclosure. Embodiments will be set forth in more detail in the figures and description of embodiments below. It will be apparent, however, that the description of embodiments is not intended to limit the present inventions, the scope of which should be properly determined by the appended claims.

BRIEF DESCRIPTION OF THE DRAWINGS

Embodiments of the disclosure will be better understood by a reading of the Description of Embodiments along with a review of the drawings, in which.

DESCRIPTION OF EMBODIMENTS

Figure 1:
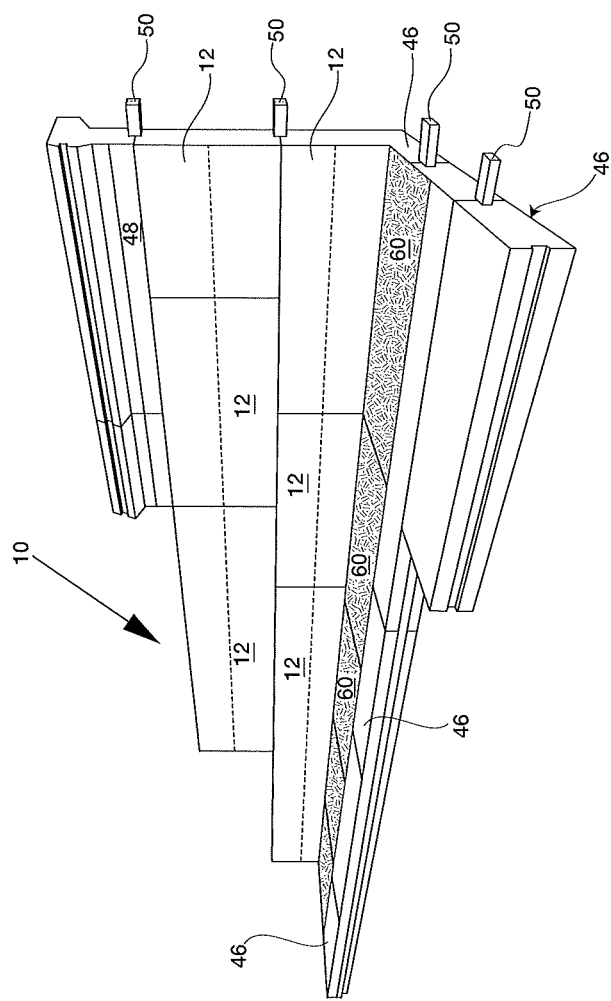
FIG. 1 is a perspective view of components assembled to form a partial floor, wall and roof transition, from inside the building.

In the following description, like reference characters designate like or corresponding parts throughout the several views. Also in the following description, it is to be understood that such terms as "forward," "rearward," "left," "right," "upwardly," "downwardly," and the like are words of convenience and are not to be construed as limiting terms.

Referring now to the drawings in general, it will be understood that the illustrations are for the purpose of describing embodiments of the disclosure and are not intended to limit the disclosure or any invention thereto.

Figure 2:
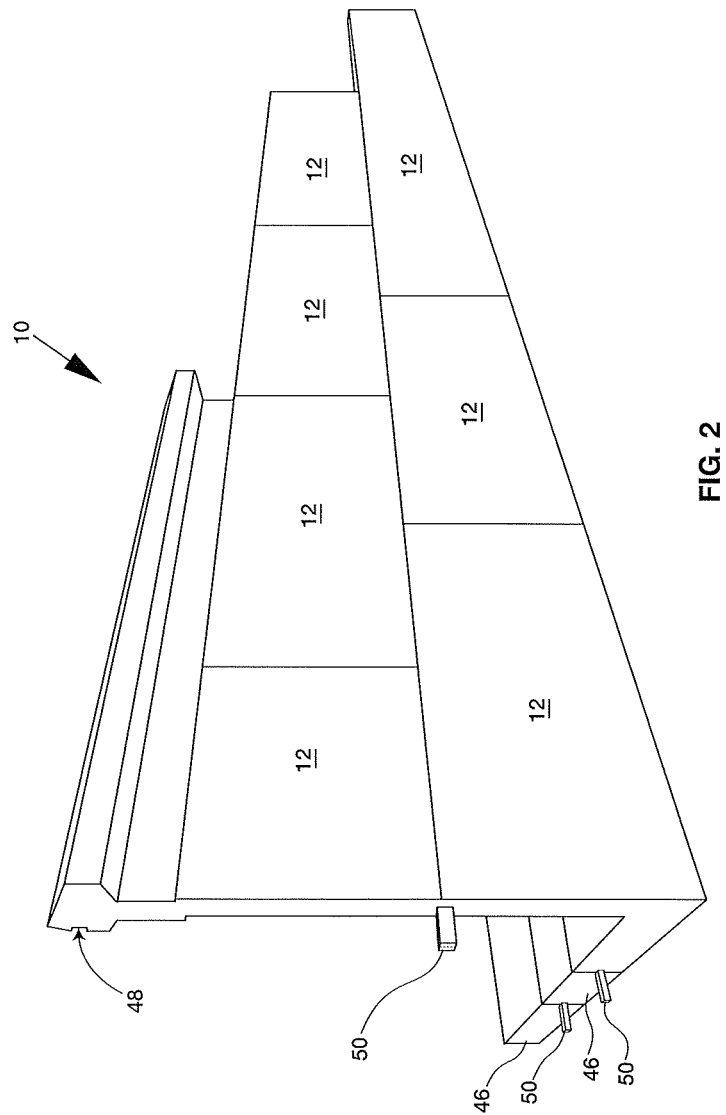
FIG. 2 is a perspective view of the components of FIG. 1 from outside the building.
Figure 3:
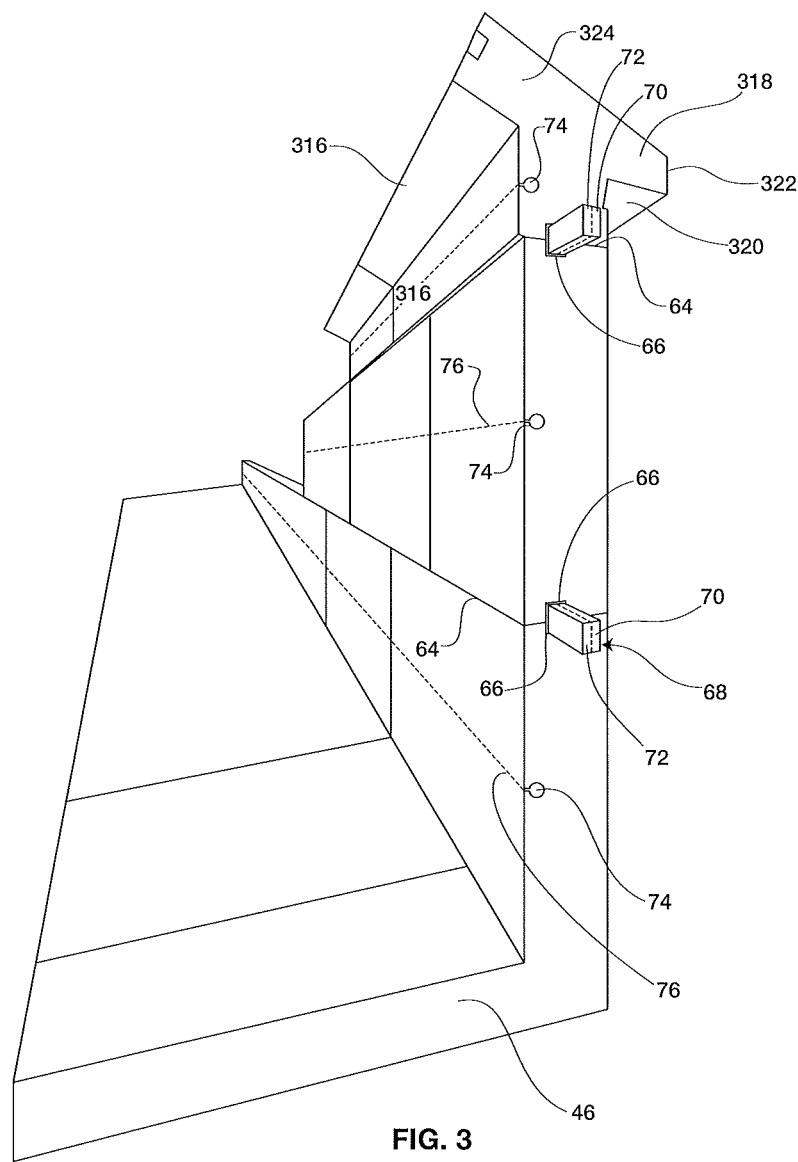
FIG. 3 is an end perspective view of the components of FIG. 1.
Figure 3A:
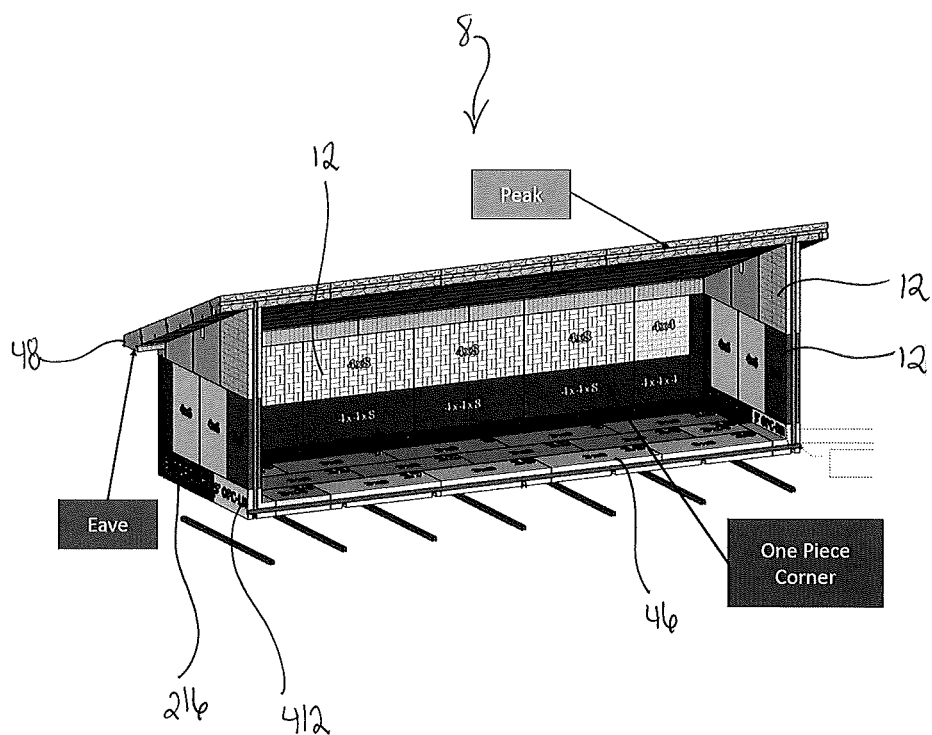
FIG. 3A is a perspective view of the components of a building according to examples of the present disclosure.

FIGS. 1, 2, and 3 show three views of a partially assembled wall 10 of EPS components 12 in accordance with an embodiment. FIG. 3A shows a partially assembled building 8.

Figure 6:
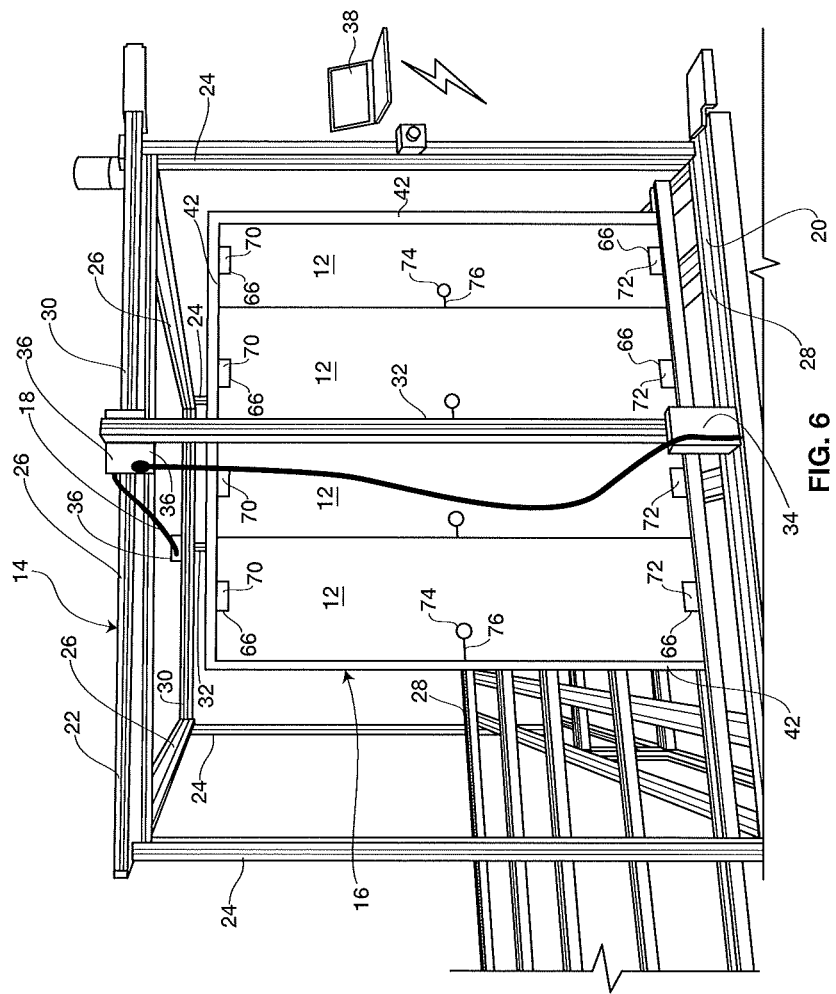
FIG. 6 is a view of a cutting jig for a block of EPS to cut and shape the components.

The components 12 used to assemble the wall are cut from one or more blocks of expanded polystyrene (EPS). A suitable cutting jig 14 and a block 16 of EPS are shown in FIG. 6. The EPS block 16 has been cut to make components 12 with desired shapes using hot wire technology, where an electrical current is applied to a thin wire, causing the wire to heat up in response to an electrical current. The current can be regulated with a simple adjustable transformer or other suitable control. The wire is brought to the melting temperature of the EPS, at which point it can be guided via the use of computer-controlled motors and mechanisms, to create a travel through the block 16 of EPS to form geometric shapes of individual components, with a high degree of accuracy.

The jig includes a base 20 to precisely locate a block 16 of EPS and has parallel horizontal tracks 28. A gantry 22 supported on the base 20 has four peripheral uprights 24 connected with one another at a height greater than the top of the EPS block to be cut by four horizontal supports 26 including two opposing horizontal tracks 30 directly above the tracks 28 on the base. The two sets of horizontal tracks 28, 30 support opposed near and far vertical tracks 32 that have motors 34 to drive the vertical tracks 32 left or right along the horizontal tracks 28, 30. The vertical tracks 32 support carriages 36 having motors so the carriages 36 that can move vertically along the vertical tracks 32. The wire 18 to be heated extends tautly between the carriages 36 and is connected to a power supply to pass a current through the wire to heat it to the temperature needed to melt and cut the EPS. The motors that move the vertical tracks 32 with respect to the horizontal tracks therefore can change the x-axis position of the hot wire. The motors that move the carriages 36 on the vertical tracks thus can change the y-axis position of the hot wire, controlled by a programmed computer 38 or a programmable logic controller. The x-y changes can take place simultaneously to make diagonal or other desired shapes. Other mechanisms can be used to cause the x-y movements of the hot wire, such as pulleys and drive wires.

The computer-controlled motors and mechanisms provide a meticulously designed travel path for the hot wire to produce the maximum number of useable building components, with a minimum amount of resulting waste material. In particular, the outer faces 42 of the block 16 can initially be cut away by a thickness of about one-half inch to remove any blemishes or dents that the block may have sustained in shipping and handling. This "waste material" is also functional; because it can be left lightly attached to the desired, formed components, so as to temporarily protect bonding surfaces during handling. Thereafter, the waste can be gathered up and returned to the supplier of the EPS blocks to be recycled.

Once the hot-wire cutting of the desired EPS components has been completed, the cut components can be separated from one another for assembly into a building on a foundation. When the EPS components are assembled, a glue or adhesive may be applied to one or both of the faces that come into contact, in conventional fashion.

FIG. 1 shows the inside of the wall, including a floor 46, and an upper wall configuration 48 leading to a roof. The wall is assembled from a plurality of EPS components 12, stacked on one another, with a channel and key locking assembly and an adhesive between the components. The right side of FIG. 1 shows keys 50 extending beyond the EPS components. The right side of the wall shown in FIG. 1 is capped with components shaped as a one-piece eave (OPE) 48, discussed below. Sheets of Magnesium Oxide (MgO) board 60 are shown arrayed on the floor 46 to provide a wear surface.

FIG. 2 shows the outside of the wall, with stacked components 12 extending upward from a foundation and again capped with a one-piece eave 48. FIG. 3 shows an enlarged, end view of the wall 10, so the seam 64 between components 12 is more visible, the seam being the locus of adhesive holding the components together. Also at the seam, each component 12 is made with a channel 66, so two adjacent components 12 have their channels 66 cooperating to make a larger hole, with a spline or key 68 that is made of two smaller key elements 70, 72. The key 68 fills the hole made by the facing channels and provides strength against shearing of the wall at the seam 64. The configuration and fabrication of the key elements 70, 72 to make the key 68 is discussed below.

Also visible in FIG. 3 are raceways 74 extending horizontally in the wall that can be used to install utilities, such as plumbing, wiring, cable, data buses, and the like. The raceways 74 are cut into the components 12 as the components 12 are cut from the EPS block, under the computer program and are visible in FIG. 6. In the embodiment shown in FIG. 3, the raceways 74 are circular in cross section and have a cut 76 leading to the inner wall surface to enable wires to be embedded in the component 12 in the raceway. Other raceway configurations and placements can be used.

The channels 66 are preferably rectangular-shaped and created on an outside surface of a component, even if the surface is on the outside of the block. Two vertical cuts are made on an outside face of the block shown in FIG. 6, along with one horizontal cut extending between the lowermost end of each of the two vertical cuts, producing a removable key element 70. Typically the horizontal cut will be twice the length of each vertical cut, so that the two removed key elements 70, 72 can be placed long-face to long-face, rotated 90 degrees to their original orientation and fit snugly in one of the channels 66. Half of each of the key elements 70, 72 will protrude from the channel 66, so that an adjacent EPS component 12 with a channel 66 can be placed with its channel facing the channel of the first component, so the two key elements 70, 72 engage the channels 66 on the two components 12 to form a tight-fitting alignment guide for the adjoining components. This approximates a "tongue and groove," joint without having a tongue; instead two grooves are matched and a mating key or spline is made of the two cutouts that made the grooves. If desired, the keys can be inserted into the groove formed by two already-adjoining components. By forming channels and not forming tongues, this technique prevents the waste of EPS material (and the labor to dispose of it) that would be needed if a tongue were to be formed on the end face of the component.

Figure 4:
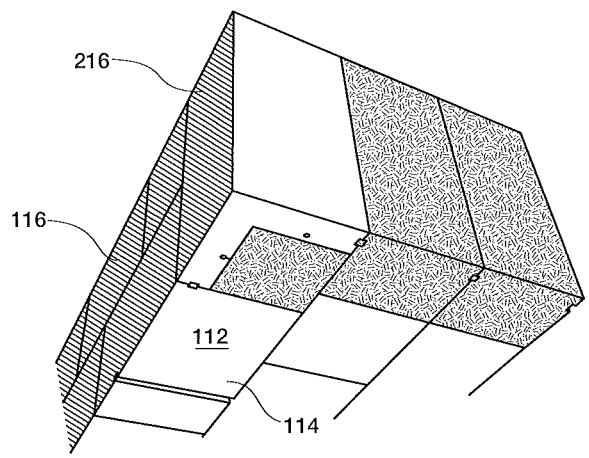
FIG. 4 is a bottom perspective view of an embodiment showing the assembly of components around vertical and horizontal corner components.

Certain components can be formed to be used as multiple elements in a structure. The combination of the individual features into a single element improves both the intended performance of the resulting product, and the ease and speed with which the elements can be assembled into the finished product, such as the components of a dwelling. For example a component 112 can be shaped to serve as a section of a building floor 114 and a portion of a wall 115 all in one monolithic component, i.e. a "one piece corner" (OPC horizontal), as seen in FIGS. 3A and 4. One advantage of this approach is the elimination of a potential infiltration path for air, water, and insects, which normally would exist if the wall and the floor were individual components. Were it not for the OPC design, closing the infiltration path would require additional materials and effort.

Figure 5:
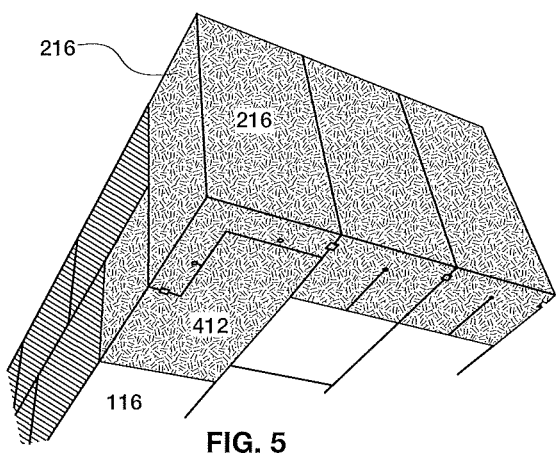
FIG. 5 is a bottom perspective view of another embodiment showing the assembly of components around a compound corner component.

In addition "vertical" OPC components 216 as seen in FIGS. 4 and 5 can be used at the intersection of two exterior walls wherever they may occur in a structure. The attributes described in the "horizontal OPC," described above, also apply to this component: reduction of infiltration paths, reduction in component count, method of attachment, etc.

Figure 2A:
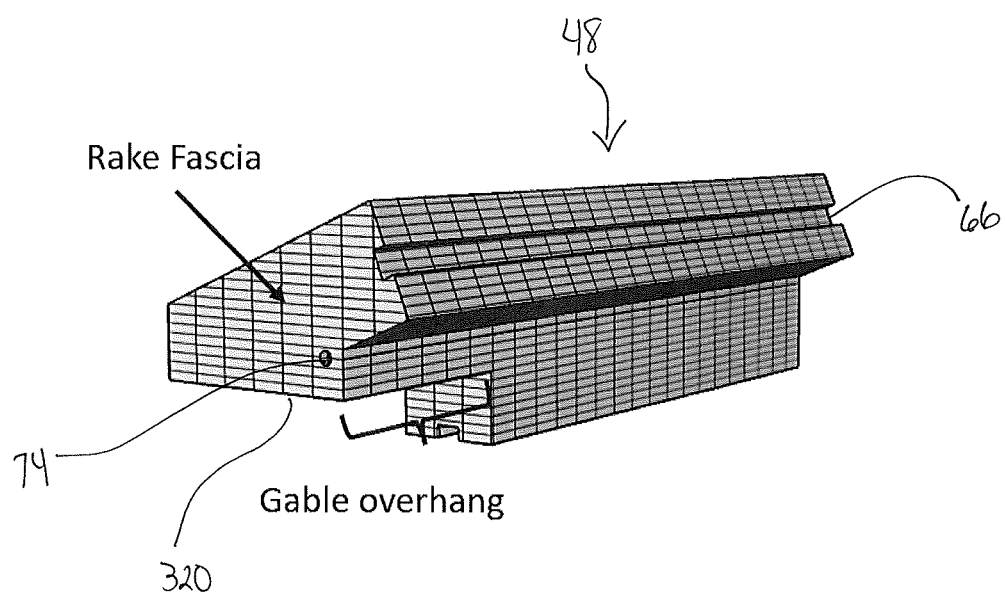
FIG. 2A is a perspective, enlarged view of the components of FIG. 1.
Figure 2B:
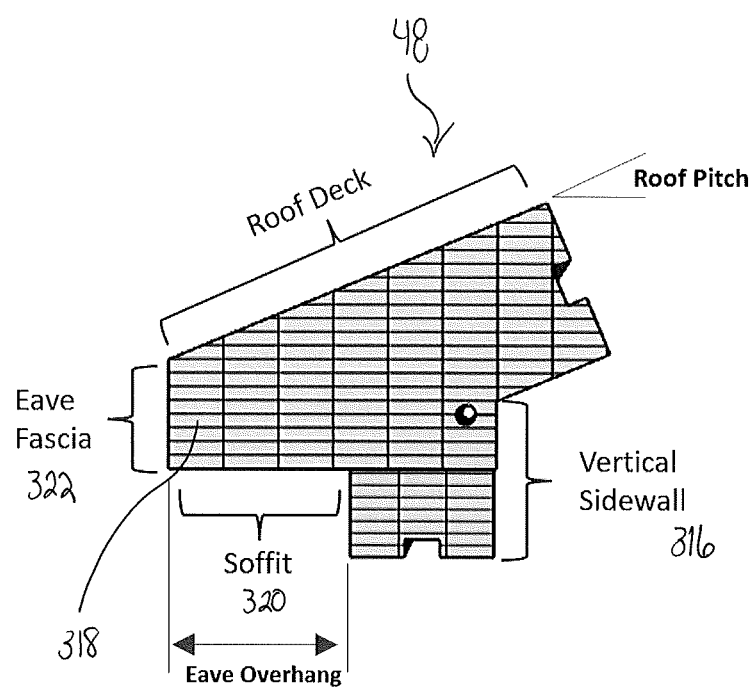
FIG. 2B is an end, enlarged view of the components of FIG. 1.
Figure 2C:
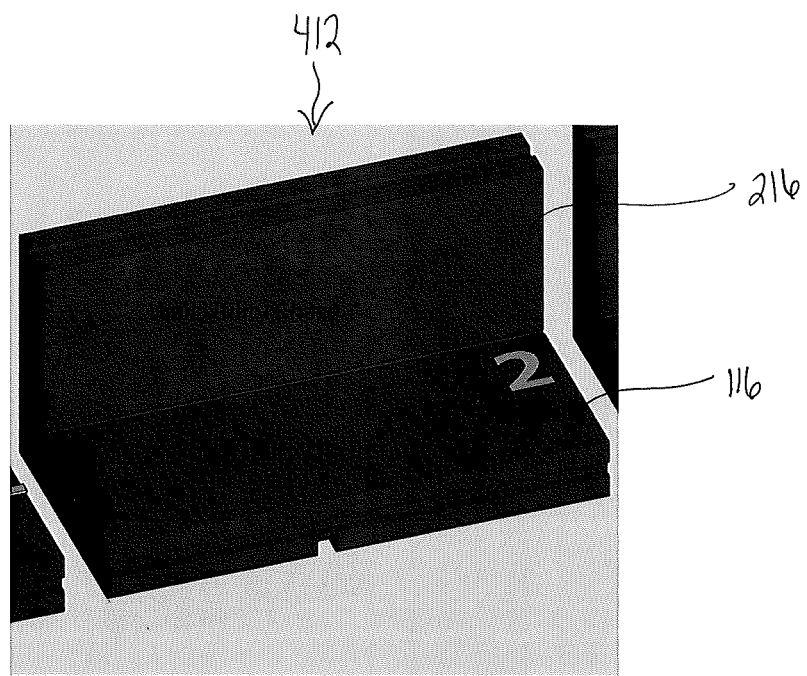
FIG. 2C is a perspective, enlarged view of the components of FIG. 1.

Along with the horizontal and vertical OPC components, a new "combination one piece corner" (COPC) 412 as seen in FIGS. 2C and 5 can be used to facilitate the attaching the horizontal 116 and vertical OPC 216 components together. COPC 412 interlocks with the adjoining components to positively align them, eliminating potential alignment error and further easing the accurate assembly of the final product. The "COPC" calls for different machines used for hot wire fabrication of EPS and a discontinuous sequence of fabrication to produce it. Prior to the advent of the COPC, a single block of EPS was formed into multiple finished components in a single pass on the contour cutting machine. With the COPC the block of EPS is partially formed on the hot wire contour cutting machine and the ancillary finished components are removed before final completion of the COPC.

A similar monolithic component, see FIGS. 2A and 2B, can be fabricated as a "one piece eave" (OPE) 48 to be used as the uppermost portion of the building's sidewall 316, eave 318, facia 322, and soffit 320, as well as the lower portion of the roof field 324, as seen in most clearly in FIG. 3. This configuration incorporates multiple functions in each component. This provides multiple benefits, including eliminating multiple potential infiltration paths, reducing opportunities for error during assembly, and eliminating additional labor, part numbers, and the potential logistics footprint involved in managing more components.

Figure 7:
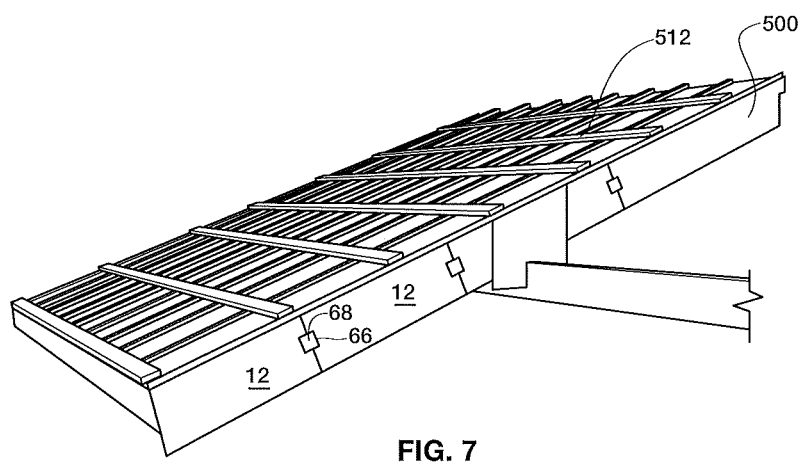
FIG. 7 is a perspective view of a roof assembly.
Figure 8:
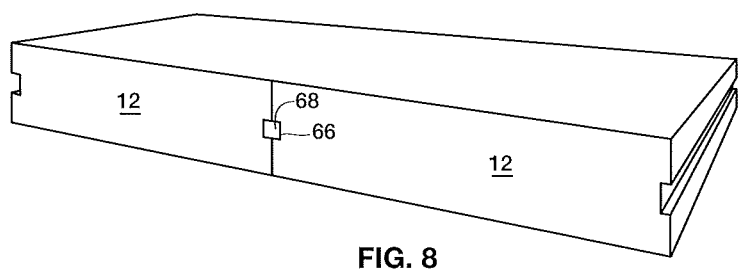
FIG. 8 is an end view of components of a roof assembly showing their weight-bearing capabilities.

FIGS. 7 and 8 show the use of components of EPS to form a roof 500 that can begin with the OPE 48. As can be seen in FIG. 7, the EPS components forming the roof are held together with keys 68 and channels 66, as described above. In the embodiment shown in FIG. 7, the roof surface is made with a standing seam material applied to the components 12. Other roofing materials can be used. FIG. 8 shows a span of components joined in this fashion and as a test platform that successfully supported men of 200 pounds weight standing on them near the seam between the two components.

Figure 9:
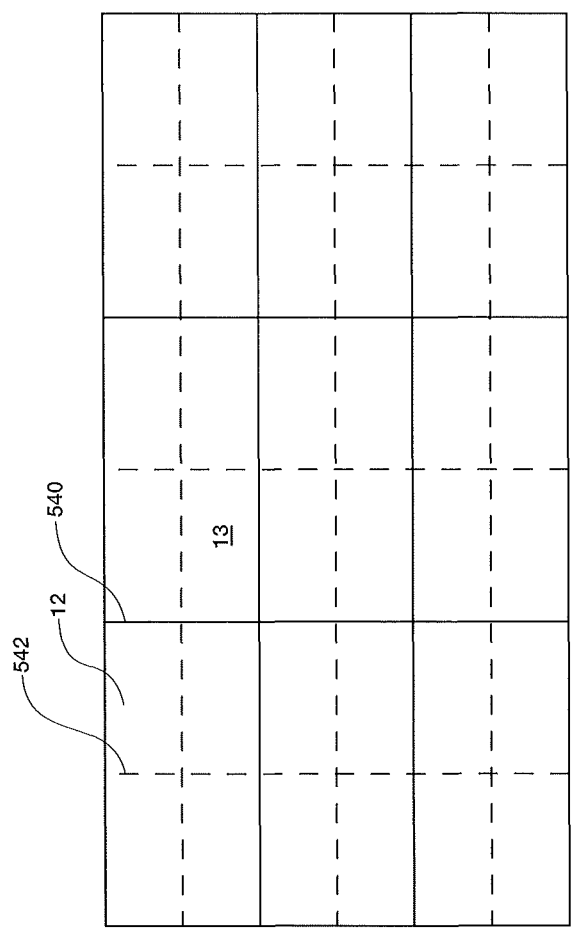
FIG. 9 is a schematic view of the relative placement of EPS components and MgO covering boards.

In some embodiments, the walls and floor can be strengthened and protected from damaging impacts by applying sheets of a magnesium oxide (MgO) facing to the face, outer face of the assembled EPS components 12. Applying the MgO sheets 13 after the EPS components 12 are assembled allows the MgO sheets to overlap the seams 540 of the EPS, as shown schematically in FIG. 9. Seams 542 between MgO sheets do not overlie the seams between EPS components. The overlapping installation reinforces the bond between EPS components and further inhibits potential of infiltration paths. The MgO facing provides fire resistance, as well. The MgO sheets used as facing may provide low thermal and electrical conductivity. The MgO sheets may produce a strong bond to the EPS components. The MgO sheets may be compatible with the use of an adhesive. The MgO sheets with the components may be stable when exposed to heat and freeze-thaw cycles with non-shrinking characteristics.

In some examples, the EPS component and the MgO sheet may form a bonded component with the EPS component and the MgO sheet attached. The attachment may be aided by way of adhesive. The bonded component may provide a building material that is non volatile without organic emissions, without asbestos, formaldehyde, ammonia, silica, or benzene. The bonded component may be mold and mildew resistant for use in various climates. The bonded component may produce a low carbon footprint as opposed to traditional building materials. The bonded component may exhibit CO2 absorption from the atmosphere during formation and use. The bonded component may be up to 100% recyclable and do not degrade with detrimental environmental consequences.

The bonded component may include an MgO sheet layer bonded to a core of EPS component. A bonded component may also include a second MgO sheet and be sandwiched by the second MgO sheet layer on an opposite side of the MgO sheet layer. The bonded component may include attributes of thermal efficiency with a very high insulation value (R=3085 in thick). The bonded component is dimensionally stable, does not readily absorb water, is lightweight for a building material, discourages infestation with pests (not a food source for bugs/pests) and includes a very high compressive strength. Bonded components may include a Class A flame spread index, making the structure more flame safe than traditional construction without the additional of flame retardant treatments which reduce lumbers physical properties and add significant expense.

Additionally, bonded components do not require multiple skilled tradespeople specialized in specific construction skills to be booked and prioritized for efficient building to proceed. The monolithic structure of the assembly of the bonded components reduces the time and expense of scheduling varied skill installation workers. A manufacturing plant may be developed on-site at the building site or a mobile manufacturing plant for bonded components may be utilized that reduce hauling costs over long distances for building materials. Alternatively, preformed bonded components may be delivered on-site and assembled/set on a foundation for less cost with mainly just utility hook-ups being required. Construction with the bonded components reduces scrap over traditional building techniques. In some instances, a house may be completely assembled within one day, and in other examples, in under a week.

Bonded components may be joined one with another by any means described within the present disclosure and may be joined by joints formed along a length of the bonded component interface. Bonded components may be attached together to form a single cohesive structure as opposed to relying on, as in conventional construction, a framework or boards reinforced by OSB sheets and held together at singular points by single point fasteners.

Bonded components may be overlapped in layers such that a MgO sheet creates a seam between adjacent MgO sheets at a different location than a seam location between adjacent EPS components. By way of example, the seams of MgO sheets may cover or misalign with the seems of EPS components.

Figure 10:
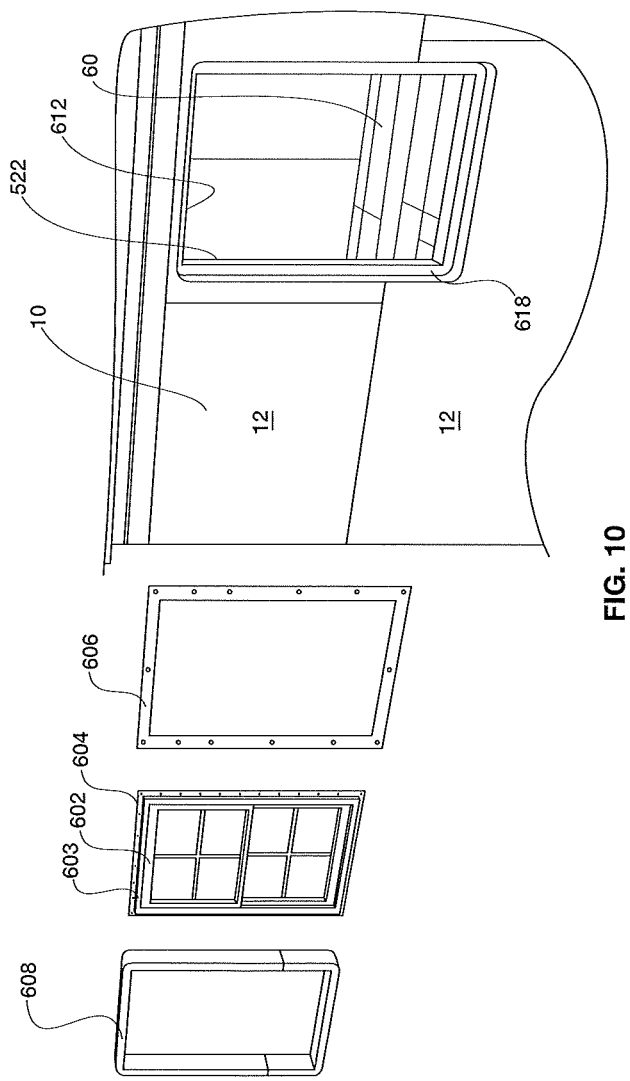
FIG. 10 is an exploded, schematic view showing a window or door installation in an EPS component wall.

FIG. 10 shows the installation of a window in a wall 10 assembled of EPS components 12. First, an opening 612 is cut in the wall 10 large enough to receive the window frame 603, but not the window's nailing fin 604. The inside edge of template 606 can be used to guide where to cut. Second, from the outside face (or inside face, if preferred) of the wall, a counterbore 618 is made to remove a rectangular frame 608 made of EPS from the inside edge of the opening 612 cut in the wall, keeping the removed rectangular frame 608 intact, and leaving the remnant wall 622 outwards of the cut depth intact. The counterbore should be made about one-half the thickness of the wall 10 and with an outer dimension large enough to allow the window and its nailing fin 604 to fit within the counterbore formed by the removing the frame 608. A thin slice is removed from the vertical face of the frame 608, equal to the thickness of the window nailing fin 604. Adhesive is applied to both sides of the window's nailing fin, and the window is placed in the counterbore 618 inside of the wall, making sure the face of the window frame comes up flush with the surface of the wall, and the window flange butts firmly against the recessed face of the EPS. Adhesive is applied to the outer perimeter of the frame 608, and frame 608 is pressed back into place against the window nailing fin 604. The frame 608 is clamped in position, and allowed to cure. As a result, the window's nailing fin 604 is sandwiched between the remnant wall 622 and the frame 608, with the functional window installed and available for conventional use. The installation therefore is airtight. The similar procedure can be used for door installations, except the removed frame will not have a lower cross-piece.

Figure 11:
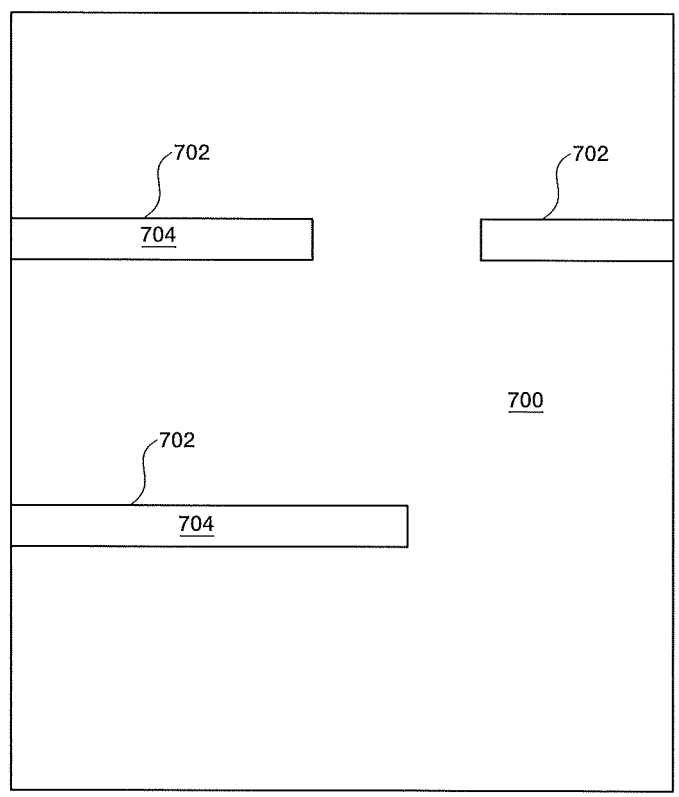
FIG. 11 is a view of a full size floor plan useful in the assembly of buildings.

FIG. 11 shows a simple full size floor plan 700 that could be used in the assembly of buildings, particularly in connection with the EPS component technology. The full-scale floor plan or "blueprint" is printed on a protective film. The film is weakened along die-cuts 702 at the time of printing, outlining precise places 704 where partitions are to be installed on the plan. The film is applied to the floor 60, clearly showing the places for the partitions, eliminating the need for chalk lines or the like. When a partition is to be installed, the weakened, die-cut areas 704 are removed from the film, exposing areas of the floor that are to receive a partition, allowing adhesive to be applied to secure the partition walls in place on the floor.

The preferred EPS for the components has a density of about one pound per cubic foot and a load carrying capacity of eleven pounds per square inch. The preferred MgO board has a sufficient thickness to be load bearing and has fire resistance. In one affordable building configuration, sufficient wall, eave and roof components can be made from 33 standard size (4'×4'8') EPS blocks to build a one thousand square foot building with a R-48 insulation rating. While not all EPS manufacturers use this mold size, it is the largest mold size that is in relatively common use. A block with those dimensions permits optimization of cutting patterns and is the largest practical block size (for manual part handling considerations) which provides more coverage per part. Using as large a block as possible enables cuts that result in fewer finished parts being needed to cover a given area, reducing cutting machine time, assembly labor, and adhesive usage. Also, 4×4×8 raw blocks allow for optimum shipping density using standard semi-trailers.

Other block sizes can be used (for example, 4×3×8) by adjusting the cutting programs to accommodate the different sized raw blocks and modifying the combination of finished part sizes used in assembly. If parts are handled mechanically rather than by hand, there may be a benefit to using larger block sizes—such as a 12 foot or 16 foot block.

The standard perimeter wall of EPS has a thickness of one foot, and the standard interior or partition wall EPS thickness is four inches; but other dimensions can be used. The thicknesses of the blocks for the floor and roof are also preferably one foot thick.

The wall thickness needs to be great enough to reliably bear its load. An interior partition wall that supports the roof and/or roof beams is 3.5" (with ¼" MGO on both sides), but that's not necessarily a hard and fast lower limit. For interior partition walls that are not required to support roof loads thinner walls could be used to maximize interior space without risk of failure due to structural loads.

The primary determinant of the spline size is the required keyway (groove) dimension. In certain areas of the house (the 'halo', ridge beam, vertical columns, et al.) it is advantageous to use splines made of cold-rolled metal instead of the EPS keys, to help distribute and transfer higher loads where needed. The metal shapes have to be a certain size to perform carry the loads. But to minimize the number of unique parts, it is preferred to size the EPS keys so that when paired and installed, they fit in the same keyway as the metal shapes.

Various adhesives can be used to bond EPS to EPS or EPS to MgO and/or other substances. Adhesive manufacturers provide recommendations for specific formulations for specific substrates and general applications. These choices are also enforced to a degree by International Code Council-Evaluation Service (ICC-ES) evaluation reports that specifically list approved adhesives for specific construction details/materials that confer automatic code compliance.

Figure 12:
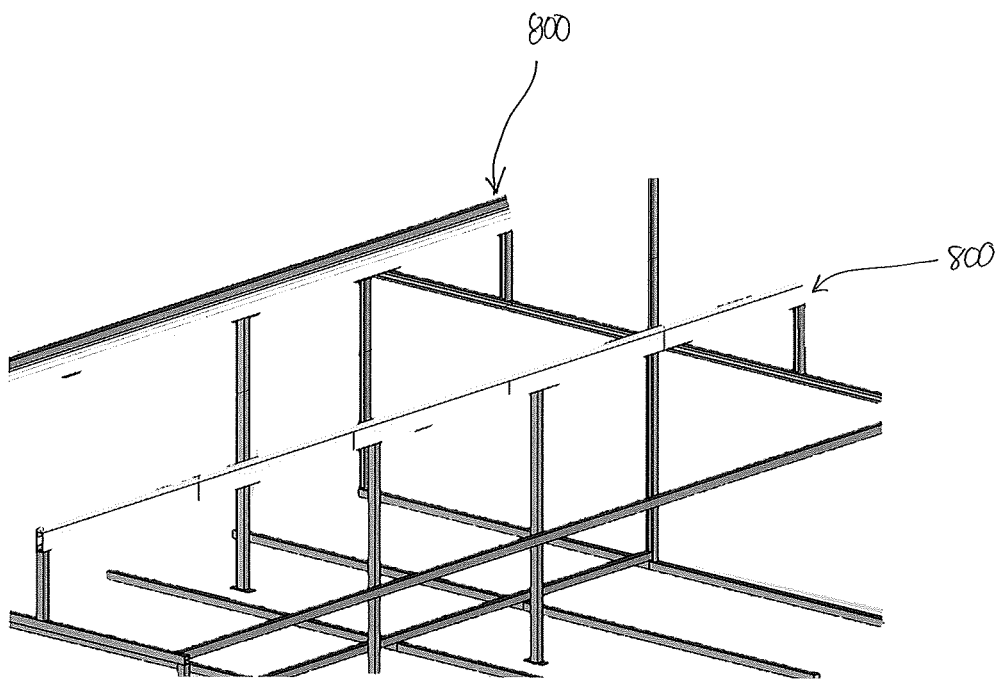
FIG. 12 is one example of a structural support beam according to embodiments of the present disclosure.
Figure 13:
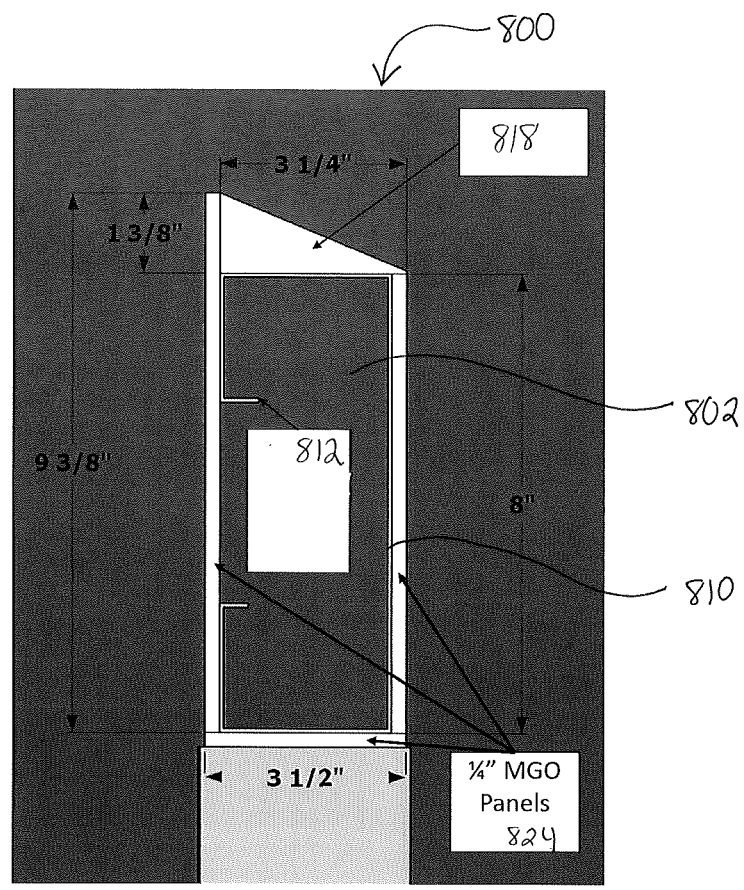
FIG. 13 is an end view of one example of the structural support beam of FIG. 12.
Figure 14A:
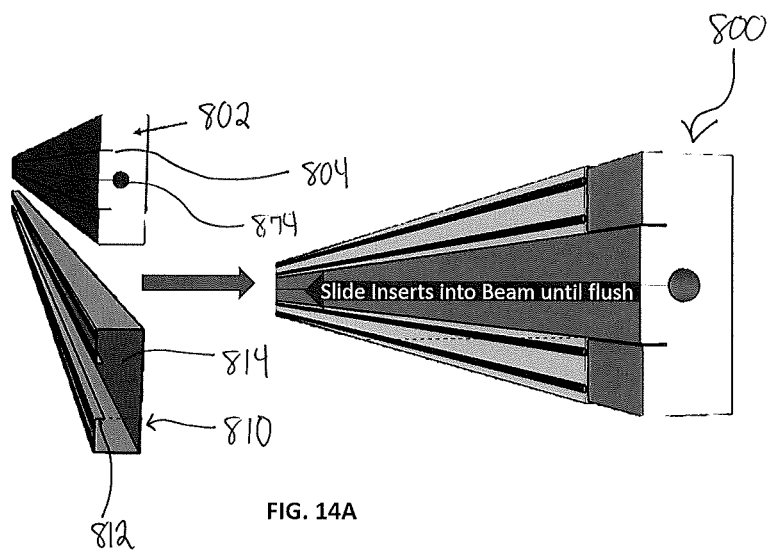
FIG. 14A is a perspective, exploded view of one example of the structural support beam of FIG. 12.
Figure 14B:
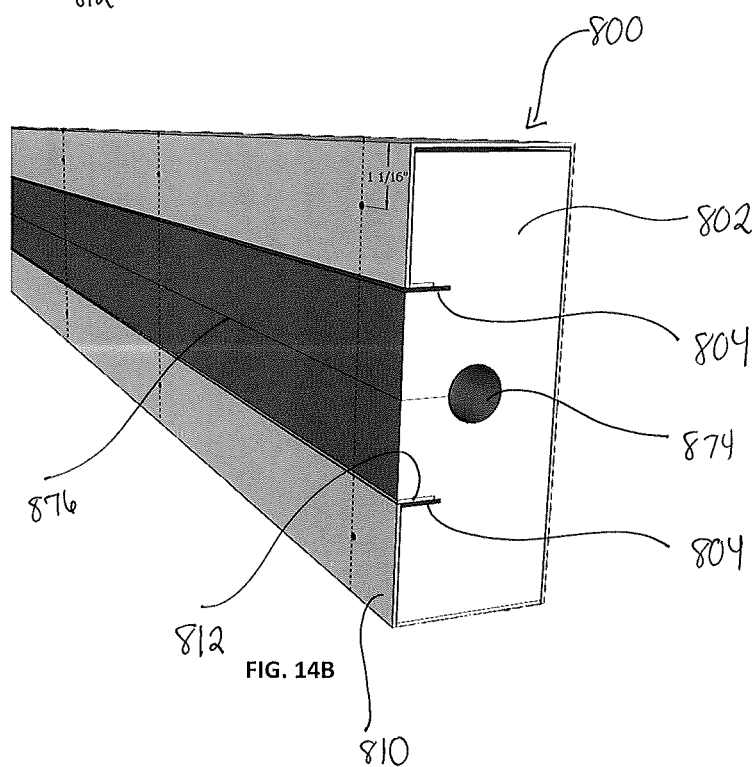
FIG. 14B is a perspective end view of one example of the structural support beam of FIG. 12.
Figure 15:
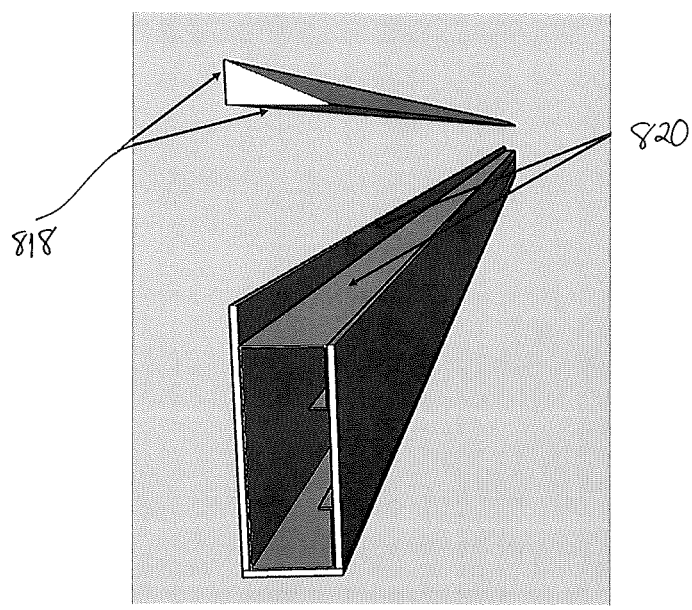
FIG. 15 is an end, exploded view of one aspect of the structural support beam of FIG. 12.
Figure 16:
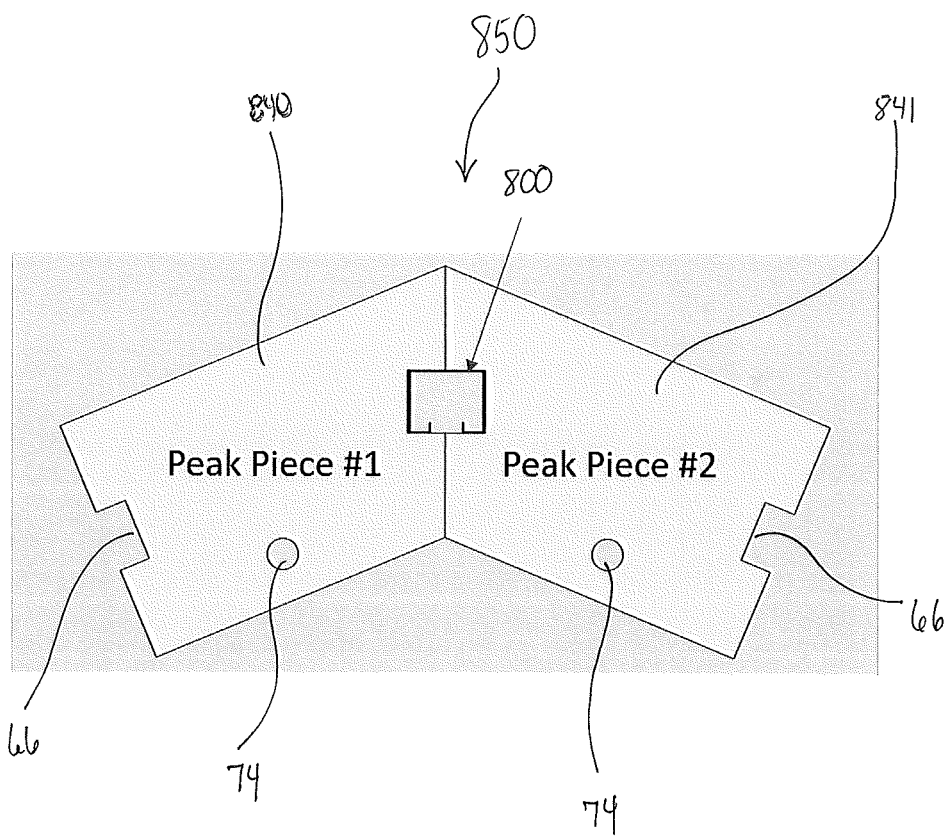
FIG. 16 is a cross-sectional view of one example of a roof peak according to one example of the present disclosure.

In some embodiments, structural support beams 800 (FIGS. 12-15) may be integrated in a building assembly of bonded components and/or EPS components. By way of example, a longitudinal roof support beam 800 may be included and may provide support and also serve as mounting for ceiling fans and lighting fixtures. A longitudinal roof support beam 800 may be included and staggered by bonding sequence on each side, as in FIG. 12. FIGS. 13 and 14 show examples of a structural support beam 800 including a metal roof beam 810 and an EPS insert 802. The metal roof beam 810 may include a center opening 814. The metal roof beam 810 may include feet 812. The EPS insert 802 may include an inset 804 for accepting feet 812 and/or a cut 874 leading to a raceway 874 forming a wiring and access channel. The structural support beam 800 may include a panel 824 attached to the outside of metal roof beam 810. More than one panel 824 may be attached to the outside of metal roof beam 810. The panel 824 may be an MgO panel, by way of example. The insert 802 may fit within the metal roof bean opening 814. The metal roof beam 810 may in turn be encased within panels 824 on each side of metal roof beam 810. The panels 824 may be different lengths. A filler 818 may be included in an encasement of metal roof beam 810. A filler 818 may be a triangular filler. A filler 818 may be an EPS filler. A filler 818 may meet with an extended end of a panel 824 on one side and an end of the meal roof beam 810 on another side. The panels 824 may be attached/bonded to the metal roof beam by any feasible means, for example, by screws, adhesive, friction/tension lock, nails, etc.

A roof peak 850 may include a first peak piece 840 and a second peak piece 841. The roof peak 850 may incorporate roof support beam 800. Peak pieces 840, 841 may be made as a unitary structure and/or may be bonded together. Peak pieces 840, 841 may include raceways 74. Peak pieces 840, 841 may include channels 66. The roof peak 850 may provide a transition from flat roof panels to create a ridge line peak of the roof. Roof peak 850 structure may provide solid alignment along the ridge line and the other roof components and may eliminate draft pathways. Peak pieces 840, 841 may be EPS peak pieces. The peak pieces 840, 841 may include attachment to other components through channel 66 and spline 68 attachment structure, by way of example, as previously disclosed.

The techniques, structures, and materials described herein can be used to assemble buildings other than residences, and can be used for outdoor walls and the like. For example, conventional building materials such as wood or metal framing can be used for part of the building, but in some examples, their use is not preferred.

Certain modifications and improvements will occur to those skilled in the art upon reading the foregoing description. It should be understood that all such modifications and improvements have been omitted for the sake of conciseness and readability, but are properly within the scope of the following examples.

Numerous characteristics and advantages have been set forth in the foregoing description, together with details of structure and function. Many of the novel features are pointed out in the appended claims. The disclosure, however, is illustrative only, and changes may be made in detail, especially in matters of shape, size, and arrangement of parts, within the principle of the disclosure, to the full extent indicated by the broad general meaning of the terms in which the general claims are expressed.

We claim:

1. A building assembly comprising:
a set of components of expanded polystyrene (EPS) assembled to form a building,
wherein the components are formed using a hot wire cutter that cuts the components from a set of EPS blocks,
at least a portion of the components adapted to be mated one with another to form one or more walls and a floor of the building,
a set of component keys cut from the set of components of expanded polystyrene (EPS) to be aligned and joined, the set of component keys from separate components joined together to form a joined spline, the joined spline turned 90 degrees from their cut orientation and reinserted into aligning grooves left from removing the component keys, and
a set of magnesium oxide (MgO) sheets for overlaying atop the components to provide strength and durability to the floor of the assembly.

2. The building assembly of claim 1 wherein the components include a wall component.

3. The building assembly of claim 2 wherein the components include a floor component.

4. The building assembly of claim 3 wherein the components include an eave component.

5. The building assembly of claim 1 wherein the components include a one-piece corner.

6. The building assembly of claim 1 wherein the components include a one-piece wall and floor component for eliminating a seam having an ingress point between the wall and the floor.

7. The building assembly of claim 1 including a spline for each of two adjacent components,
wherein the spline is cut from opposed grooves formed in each of the components, the spline including two lengths of EPS taken from each of the grooves,
the two lengths rotated 90 degrees from their cut orientation and inserted in adjacent grooves in adjoining components to provide stability and alignment to the building assembly.

8. The building assembly of claim 7 where the two lengths include an adhesive for joining the two lengths one to another.

9. The building assembly of claim 1 including a single EPS component including portions of walls of a corner and a horizontal floor element, forming a Combination One Piece Corner (COPC).

10. The building assembly of claim 1 including a one-piece soffit or an eave that forms a top of the wall, a soffit eave, and a roof element, together forming a unitary component of EPS and eliminating seams for ingress.

11. The building assembly of claim 10 including using a set of unitary components of EPS to form a junction between a roof and the top of the wall of the assembly.

12. The building assembly of claim 11 wherein the unitary components and the roof are adjoined by including spines and grooves.

13. The building assembly of claim 1 including a door and a window installation using a rectangular annular frame cut from EPS, the rectangular annular frame reinstalled on a flange of a window or a door to secure the window or door in place.

14. The building assembly of claim 1 wherein the components are adapted to be assembled one with another at the job site.

15. The building assembly of claim 14 wherein the MgO sheets are adapted to be assembled with the components at a jobsite to cover seams that result from joining of the components.

* * * * *